(No Model.)  A. W. STERNKE.  6 Sheets—Sheet 2.
HARVESTER.

No. 534,845.  Patented Feb. 26, 1895.

(No Model.) 6 Sheets—Sheet 3.

A. W. STERNKE.
HARVESTER.

No. 534,845. Patented Feb. 26, 1895.

Witnesses.
E. F. Elmore
Frank D. Merchant

Inventor.
Albert W. Sternke
By his Attorney.
Jas. P. Williamson (No Model.) 6 Sheets—Sheet 5.
A. W. STERNKE.
HARVESTER.

No. 534,845. Patented Feb. 26, 1895.

Witnesses.
E. F. Elmore
Frank D. Merchant

Inventor,
Albert W. Sternke
By his Attorney,
Jas. F. Williamson (No Model.) 6 Sheets—Sheet 6.
A. W. STERNKE.
HARVESTER.
No. 534,845. Patented Feb. 26, 1895.
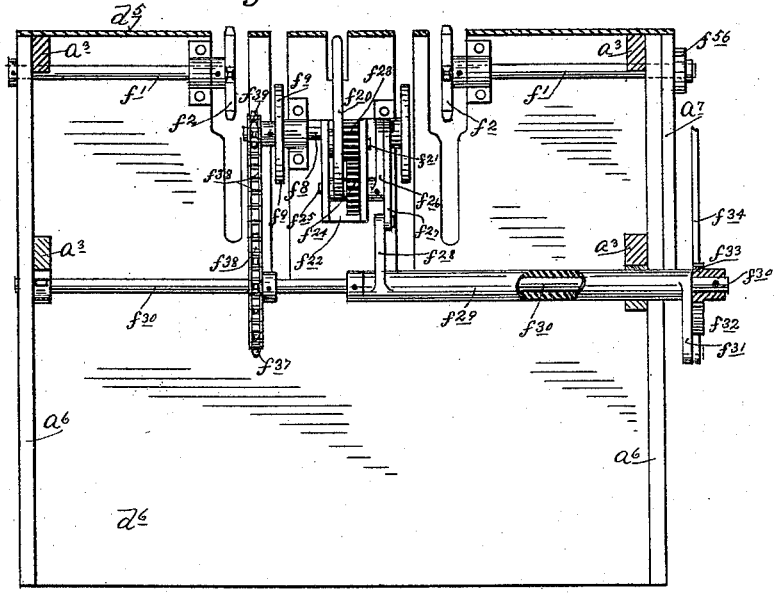
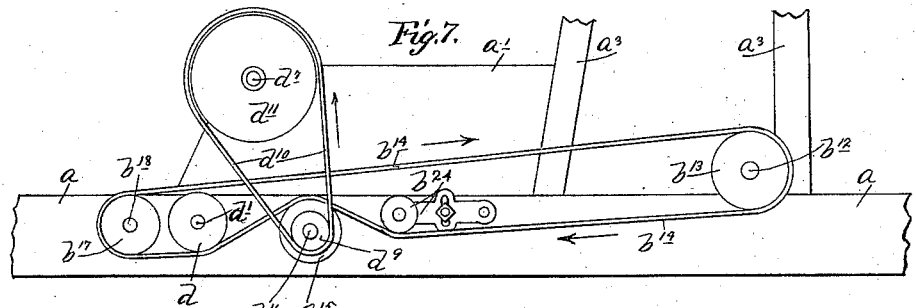
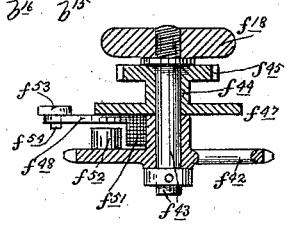
Witnesses.
E. F. Elmore
Frank D. Merchant
Inventor.
Albert W. Sternke
By his Attorney,
Jas. F. Williamson

UNITED STATES PATENT OFFICE.

ALBERT W. STERNKE, OF GAYLORD, MINNESOTA.

HARVESTER.

SPECIFICATION forming part of Letters Patent No. 534,845, dated February 26, 1895.

Application filed April 24, 1894. Serial No. 508,789. (No model.)

*To all whom it may concern:*

Be it known that I, ALBERT W. STERNKE, a citizen of the United States, residing at Gaylord, in the county of Sibley and State of Minnesota, have invented certain new and useful Improvements in Harvesters; and I do hereby declare the following to be a full, clear, and exact description of the invention, such as will enable others skilled in the art to which it appertains to make and use the same.

My invention relates to grain-harvesters, and has for its object to improve the general structure, with a view of obtaining a more efficient machine.

The special objects had in view are to provide a machine wherein the grain is collected into a gavel, at or near the platform level and is subsequently bound in an elevated position inside the main driving or ground wheel; wherein the collecting action is never interfered with by the binding action, thereby permitting the binder to run almost continuously, if necessary; wherein all the parts, which cooperate in the elevating and binding action may be idle, while the gavel is being collected at the platform level; and wherein the different mechanisms are so arranged and related as to minimize the transverse and the vertical dimensions of the machine, with the weight distributed at a much lower point than is customary with elevated binders, and in such manner as to avoid side draft.

To these ends, the invention consists of the several novel devices and combinations of devices, which will be hereinafter fully described and be defined in the claims.

My improved machine is illustrated in the accompanying drawings, wherein like letters refer to like parts throughout the several views.

Figure 1:
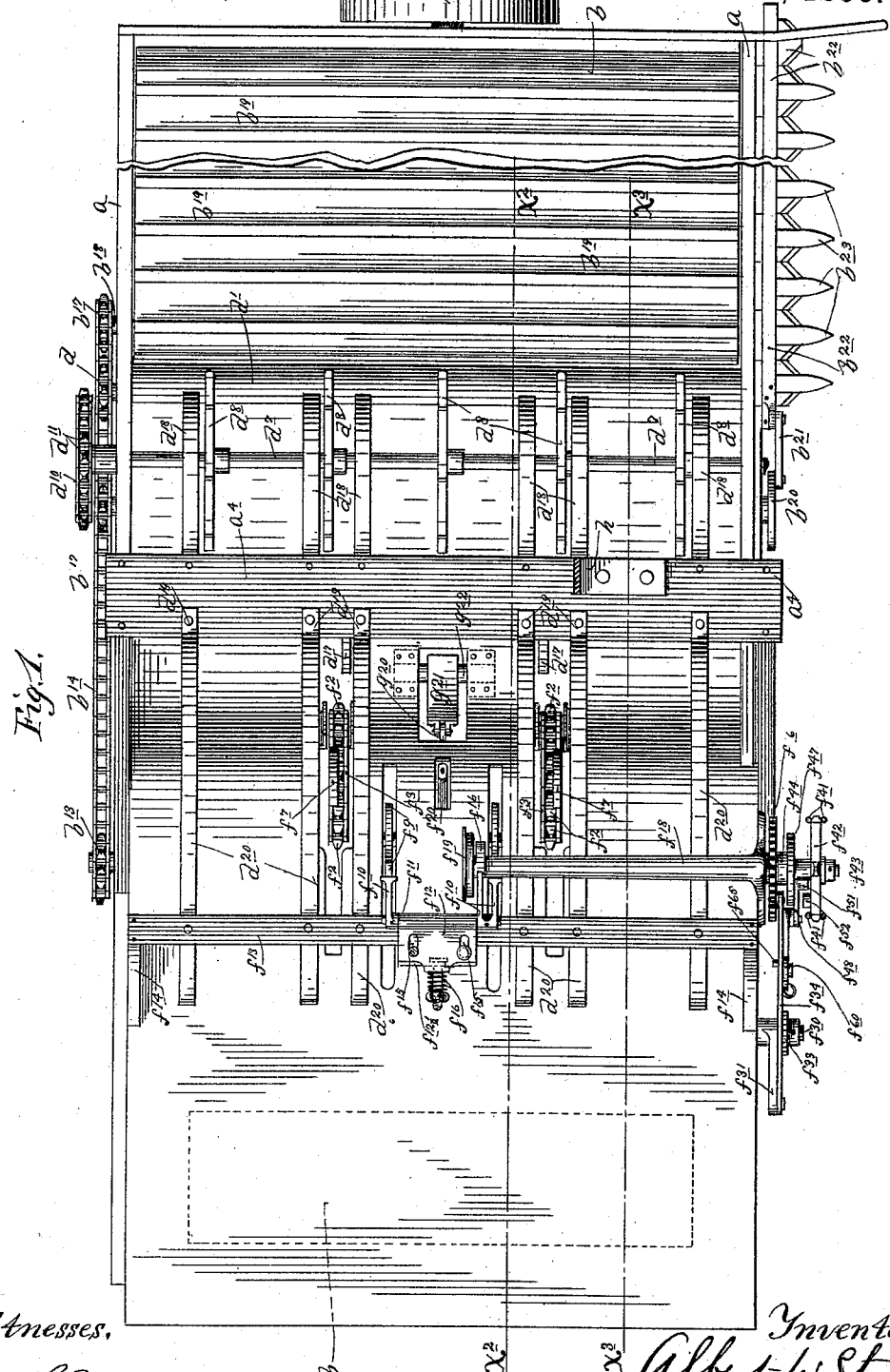
Figure 2:
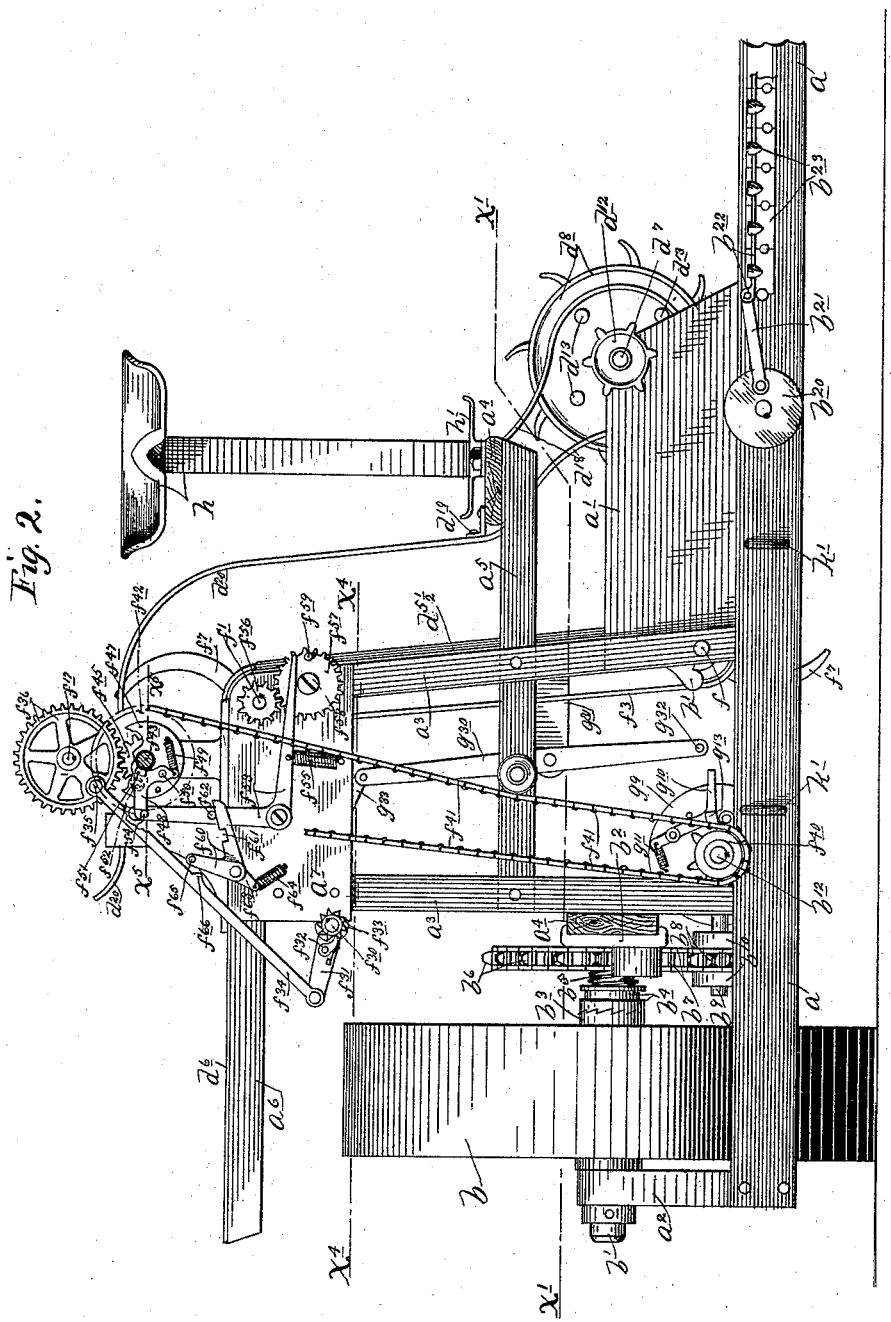
Figure 3:
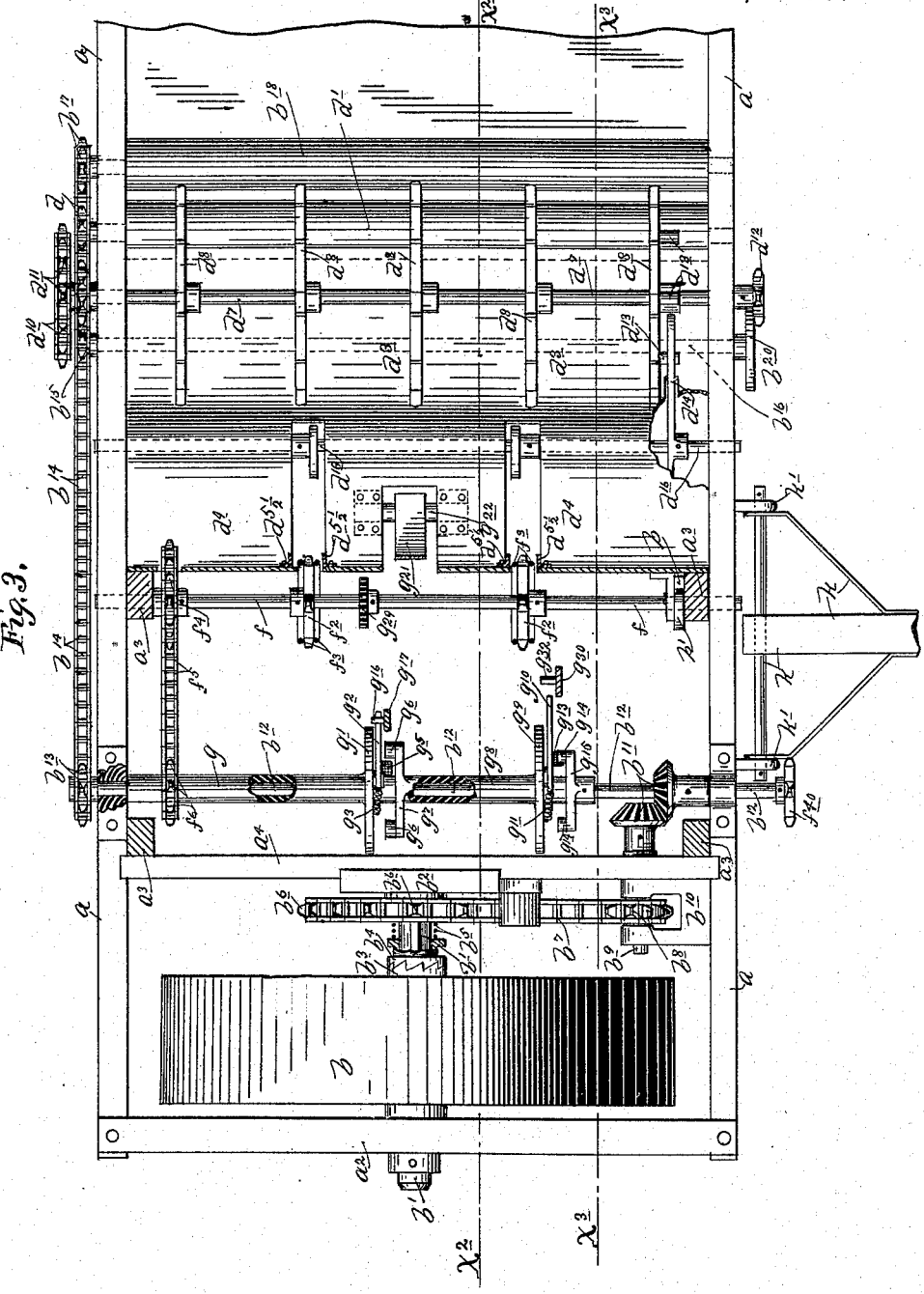
Figure 4:
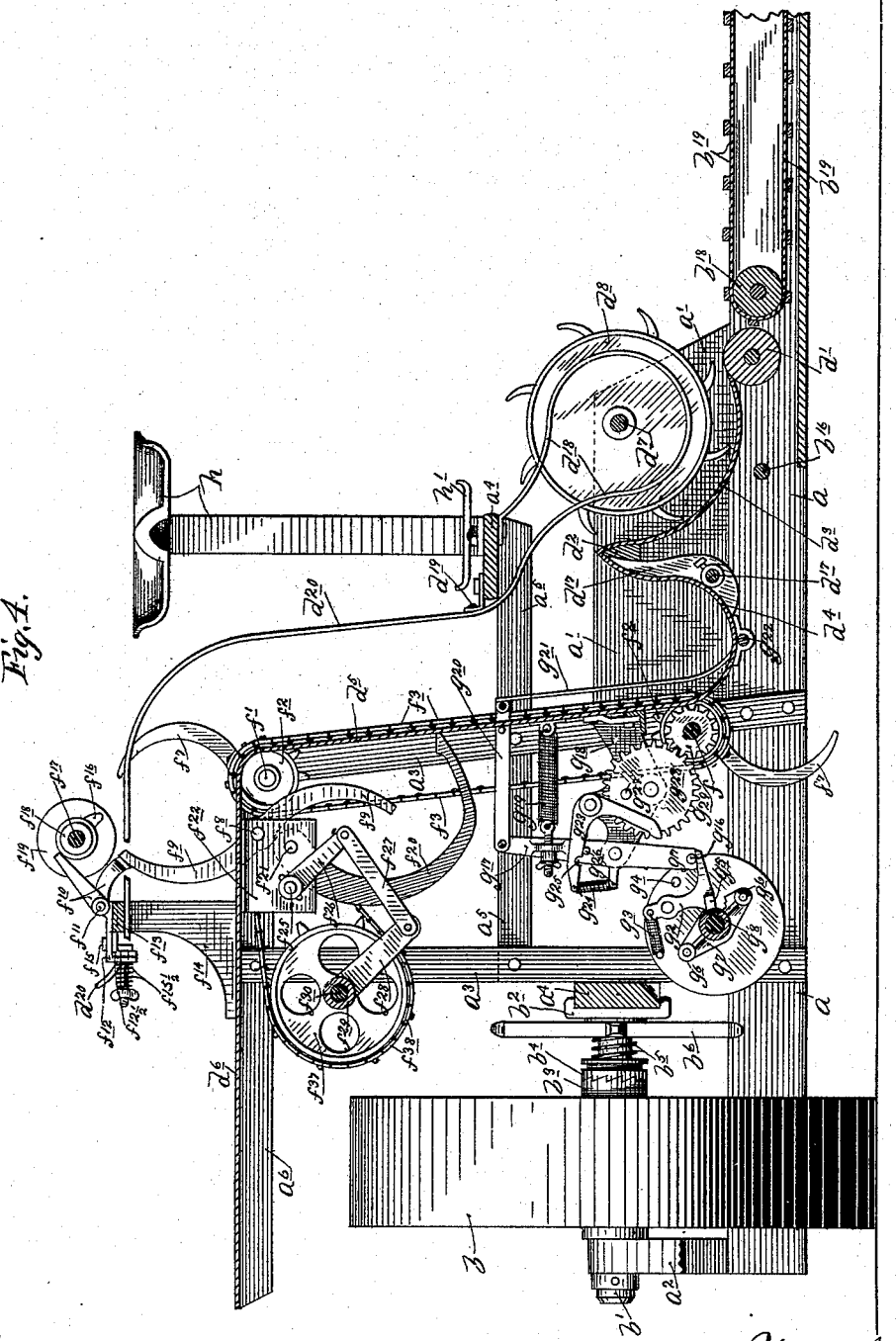
Figure 5:
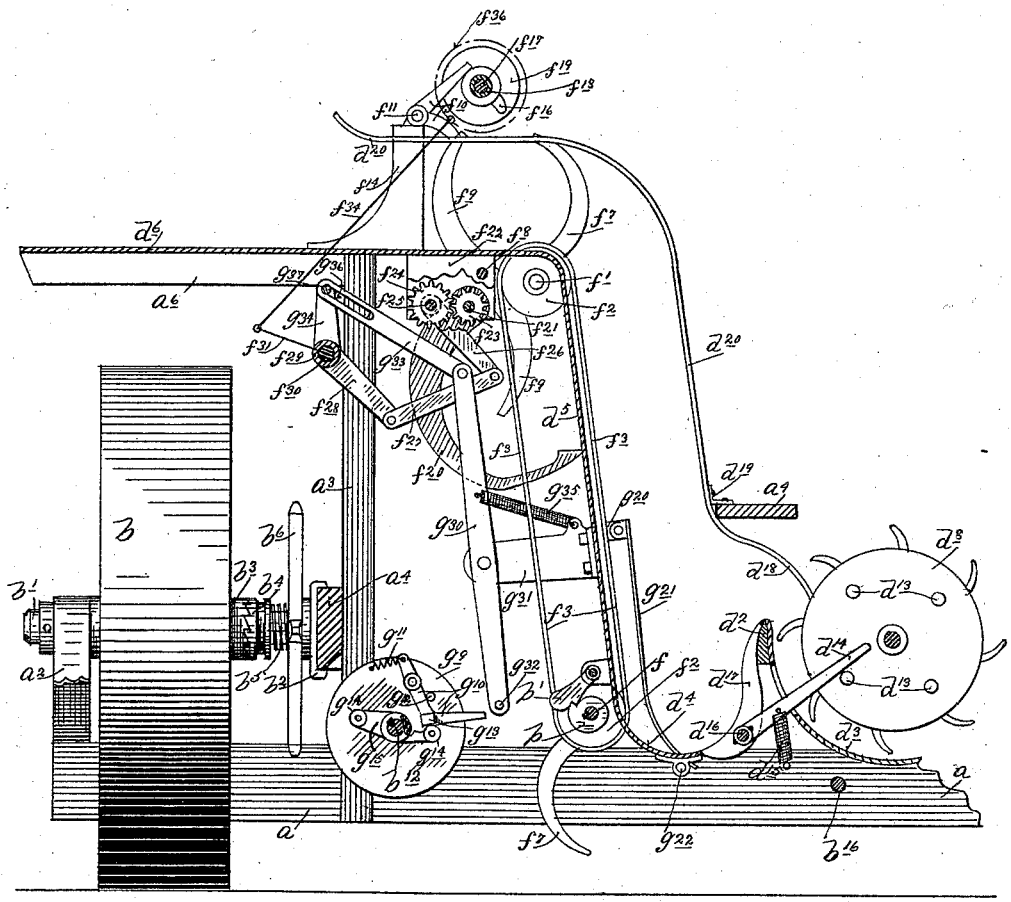

Figure 1 is a plan view of the machine, with some parts broken away. Fig. 2 is a front elevation, with some parts broken away. Fig. 3 is a horizontal section, substantially on the irregular line X' X' of Fig. 2, with some parts removed and others broken away. Fig. 4 is a transverse vertical section, substantially on the line $X^2$ $X^2$ of Figs. 1 and 3, with some parts broken away. Fig. 5 is a transverse vertical section, substantially on the line $X^3$ $X^3$ of Figs. 1 and 3, with some parts broken away, others removed, and some parts shown in diagram lines only. Fig. 6 is a horizontal section, on the line $X^4$ $X^4$ of Fig. 2, looking from below, with some parts broken away. Fig. 7 is a diagram view, in rear elevation, with some parts broken away, showing part of the driving connections in diagram lines only. Fig. 8 is a detail in horizontal section, on the line $X^5$ $X^5$ of Fig. 2, showing the clutch device constituting part of the binder drive.

The main frame may be of any suitable construction; and, for the purposes of this case, it will be sufficient to distinguish the horizontal or body portion $a$, with bearing blocks $a'$ $a^2$, the uprights $a^3$, the longitudinal and transverse tie-bars $a^4$ $a^5$, the binder table frame $a^6$, extending outward from the uprights $a^3$, and the sidings $a^7$ secured to the uprights $a^3$. The other stationary parts, so far as necessary, will be designated in connection with the description of the moving parts.

The main frame is mounted in the usual way, on the main driving wheel $b$ and a grain-wheel $c$. The main wheel $b$ is loose on the spindle or shaft $b'$, journaled in the bearing-block $a^2$, rising from the main section $a$ of the frame, and a bearing block $b^2$, fixed to the outer tie-bar $a^4$. The inner hub of the driving wheel $b$ is provided with a half clutch $b^3$, which is engageable by a sliding half clutch $b^4$, keyed to the spindle or shaft $b'$ and under tension to assume its closed or engaging position, from a spring $b^5$. The sliding half clutch $b^4$ would be under the control of a shipper-fork, not shown. On the spindle $b'$, and rigid therewith, is a driving sprocket $b^6$ connected by chain $b^7$, with a sprocket $b^8$, on counter shaft $b^9$, journaled in bearings $b^{10}$, and connected, by a pair of beveled gears $b^{11}$, with a shaft $b^{12}$, journaled in the main frame and extending from the front to the rear of the same. Through the connections described, the said shaft $b^{12}$ will be kept in constant motion, whenever the sliding half clutch $b^4$ is in gear with the half clutch $b^3$ on the man wheel $b$, and is the shaft from which motion is imparted to all the other parts of the machine. The said constantly running shaft $b^{12}$ has, at its rear end, a sprocket wheel $b^{13}$ engaged by chain $b^{14}$, which extends over a sprocket wheel $b^{15}$, on the rear end of a sickle driving shaft $b^{16}$ and around a sprocket wheel $b^{17}$, on the rear end of one of the rollers $b^{18}$, which drives the platform carrier or apron $b^{19}$. The forward end of the shaft $b^{16}$, is provided with a crank disk $b^{20}$, which is connected by pitman $b^{21}$, with the sickle $b^{22}$, mounted in the usual way in the finger-bar $b^{23}$, fixed to the front edge of the platform. The chain $b^{14}$ is subject to a tightener $b^{24}$, and engages with a sprocket wheel $d$, on the rear end of a platform delivery roller $d'$, forming a part of the feed mechanism, which conducts the grain from the platform carrier to my gavel collector.

From a point near the delivery roller $d'$, over an angular divider $d^2$, and thence downward to the bed section $a$ of the frame, upward along the inner members of the uprights $a^3$ and thence outward over the binder table frame $a^6$, extends a continuous sheet of metal, the different portions of which form respectively, a concave $d^3$, for co-operation with a feed cylinder, a trough-like receiver $d^4$, forming a part of the gavel collector, a deck $d^5$ for the elevator, and a top plate $d^6$, forming the face of the binder table.

The feed cylinder is composed of a shaft $d^7$, journaled in the bearing-blocks $a'$ fixed to the main frame, and a series of toothed disks $d^8$, rigidly secured thereto. The said feed cylinder receives motion from a sprocket wheel $d^9$, on the rear end of the sickle driving shaft $b^{16}$, a chain $d^{10}$, and a relatively large sprocket wheel $d^{11}$, on the rear end of the cylinder shaft $d^7$. At its forward end the cylinder shaft is provided with a sprocket wheel $d^{12}$, for driving the reel, (not shown.) Some one of the cylinder disks $d^8$ is provided with a series of projecting cam-lugs $d^{13}$, for co-operation with a lever $d^{14}$ and a spring $d^{15}$, to impart an intermittent rocking motion to a packer shaft $d^{16}$, having attached thereto a series of packer arms $d^{17}$, in position to act on the grain, as it is delivered by the feed cylinder, over the divider $d^2$, for straightening out and packing the same into gavels in the receiver $d^4$.

The cylinder disks $d^8$ work between guards $d^{18}$, which are formed from continuous strips of comparatively stiff metal attached, at one end, to the inner member of the frame ties $a^4$, thence curved around the cylinder shaft and secured again to the said frame-tie $a^4$, at $d^{19}$, and thence passed upward to a point above and over the binder table, which upwardly extended portions serve to form inside guards $d^{20}$, for co-operation with the gavel carrying hooks or arms on the elevator, when conducting the grain from the collector to the binder.

On upper and lower parallel shafts $f$ $f'$, are mounted a series of sprocket wheels $f^2$, which are connected by elevator chains $f^3$. Of the said shafts, the lower member $f$ is the driver and receives motion through a sprocket wheel $f^4$ fixed thereto, a chain $f^5$ and a sprocket wheel $f^6$ on a sleeve $g$, loosely mounted on the constantly running shaft $b^{12}$, which sleeve receives motion therefrom through a clutch device at the proper time, as will be presently more fully described. Normally, the sleeve $g$ and the elevator shafts and chains are idle. The upper shaft $f'$ is divided with the two sections spaced apart from each other.

To the elevator chains $f^3$, at equal distances apart, or at exactly opposite points on the said chains, are fixed gavel carrying hook-like arms $f^7$, which, under the motion of the chains, work through slots in the receiver $d^4$, and deck $d^5$, engage with the collected gavel and conduct the same from the collector to the binder. In their upward movement with the chains $f^3$, the said gavel hooks $f^7$ will project, at their outer ends, between the guards $d^{20}$, and the said guards will serve, as before stated, to prevent the escape of the grain. The chains $f^3$ are guided by deck strips $d^{5\frac{1}{2}}$ thereby reducing the friction from the grain.

In the binder table frame is journaled a shaft $f^8$, having two pairs of arms $f^9$ at diametrically opposite points and curved in opposite directions; which arms, alternately, serve as back stops for receiving the gavel from the elevator, and for holding the same under the binding action, in one position of the said shaft $f^8$, and as dischargers for ejecting the next succeeding bundle, in another position of the said shaft. In other words, one set of the said arms $f^9$ serve as back-stops for a given gavel, and the other set of said arms as dischargers, for the same gavel or bundle, when bound; and on succeeding bundles, the functions served by either set of said arms $f^9$ are alternated. The said shaft $f^8$ receives motion, at the proper times, indirectly from the binder operating shaft, through means which will be presently noted. When in their idle or receiving positions, for acting as back-stops, the said arms $f^9$ are held by a gravity lock, in the form of a bell-crank $f^{10}$, pivoted, as shown, at $f^{11}$, to a bed-plate $f^{12}$, supported from a cross-bar $f^{13}$, fixed to end-brackets $f^{14}$. The bed-plate $f^{12}$ is connected to a plate $f^{12\frac{1}{2}}$ secured to the cross-bar $f^{13}$ by slot and screw connections, as shown at $f^{15}$, and is subject to the action of a stiff spring $f^{15\frac{1}{2}}$, by which the said plate and bell-crank lock are yieldingly held with the necessary rigidity, for holding the arms $f^9$ with sufficient force, for resisting the compressing action of the gavel hooks $f^7$ on the elevator chains $f^3$; while permitting the said arms to yield, if necessary, for the accommodation of an unusually large gavel. The lock $f^{10}$ is tripped at the proper time, by a cam $f^{16}$, on a shaft $f^{17}$, journaled in a bracket sleeve $f^{18}$, fixed to the frame and provided at its rear end with a cam-disk $f^{19}$, which would be used to operate the knotter, (not shown.)

The needle-arm $f^{20}$ is fixed to a short shaft $f^{21}$, journaled in bearing-blocks $f^{22}$, fixed to the binder table frame, and having rigid therewith, a pinion $f^{23}$ engaged by a gear $f^{24}$, on a rock-shaft $f^{25}$, journaled in said bearing blocks $f^{22}$, and having an arm $f^{26}$ connected by link $f^{27}$ with an arm $f^{28}$, on sleeve $f^{29}$, which is loose on the shaft $f^{30}$, journaled in suitable bearings, fixed to the uprights $a^3$, or other fixed parts of the frame. The sleeve $f^{29}$ has attached to its front end, a lever arm $f^{31}$, having a spring-pawl $f^{32}$, engaging with a ratchet $f^{33}$, fixed to the shaft $f^{30}$. The arm $f^{31}$ is connected by rod $f^{34}$ with a crank-pin $f^{35}$, on gear-wheel $f^{36}$, fixed to the front end of the knotter operating and trip-shaft $f^{17}$.

The shaft $f^{30}$ has near its left end a relatively large sprocket $f^{37}$, connected by chain $f^{38}$, with a small sprocket $f^{39}$ on the shaft $f^8$, which carries the back stop and discharge arms $f^9$. (See Fig. 6.)

The constantly running shaft $b^{12}$ has, at its forward end, a small sprocket wheel $f^{40}$, connected by chain $f^{41}$, with a relatively large sprocket wheel $f^{42}$ (see Figs. 1 and 8) loose on a stud-shaft $f^{43}$, fixed to the standard portion of the bracket $f^{18}$. This sprocket $f^{42}$ is therefore kept in constant motion from the shaft $b^{12}$. On the stud shaft $f^{43}$, inward of the sprocket $f^{42}$, is located a sleeve $f^{44}$, having a gear-wheel $f^{45}$, engaging the gear-wheel $f^{36}$, on the shaft $f^{17}$; and also provided with a clutch disk $f^{47}$. This sleeve $f^{44}$, with the parts carried thereby is loose on the stud shaft $f^{43}$, and has on disk $f^{47}$ a pivoted bell-crank pawl or clutch member $f^{48}$, under tension from a spring $f^{49}$, also carried by the said clutch disk, which tends to rock the said pawl on its pivotal point $f^{50}$, and throw its upper arm outward to a position where a projecting lug $f^{51}$, thereon, will stand in the path of a roller or lug $f^{52}$, on the inner face of the constantly running sprocket $f^{42}$. Hence, when the said spring $f^{49}$ is permitted to become active, the said lug $f^{51}$, on the clutch pawl $f^{48}$, will be engaged by the roller or lug $f^{52}$, on the sprocket wheel $f^{42}$, and the sleeve $f^{44}$, together with the parts carried thereby, will receive rotary motion with the said sprocket wheel. The said pawl or clutch member $f^{48}$, is normally held in its innermost position, against the resistance of the spring $f^{49}$, by a bell-crank trip lever $f^{53}$, pivoted to the siding $a^7$, and provided on its vertical arm with a projecting pin $f^{54}$, which engages under the notched end of said clutch pawl $f^{48}$. The trip-lever $f^{53}$ is normally held in its innermost position, in engagement under the said clutch member $f^{48}$ by a spring $f^{55}$. It is tripped, at the proper time, through a pair of gears $f^{56}$ and $f^{57}$, related as one to two, the former of which is on the front end of one section of the divided elevator shaft $f'$, and the latter of which is on a stud shaft $f^{58}$, fixed to the frame. The larger gear $f^{57}$ is provided with a projecting stud $f^{59}$, which operates on the lower or horizontal arm of the bell-crank trip-lever $f^{53}$, at the proper time. The trip-lever $f^{53}$ is held in its releasing position, when once tripped, for the proper length of time, by a bell-crank lock-lever $f^{60}$, the lower arm of which is provided with a notch $f^{61}$, which engages with a stud $f^{62}$, on the upper arm of the trip-lever $f^{53}$. The said bell-crank $f^{60}$ has an arm $f^{63}$, to which is applied a spring $f^{64}$, tending to throw the same into its outermost position, with respect to the trip-lever $f^{53}$ and the rod $f^{34}$.

The outer arm of the bell-crank $f^{60}$ underlies the rod $f^{34}$, and has a projecting pin $f^{65}$, subject to the action of a cam surface $f^{66}$ on the said rod. In virtue of this construction, the rod $f^{34}$ will rock the bell-crank $f^{60}$ inward and downward, at the proper time, to release the trip-lever $f^{53}$ and permit the same, under the tension of its spring $f^{55}$, to assume its innermost position, as required for engaging with the clutch member $f^{48}$, and throwing the same out of gear with the sprocket $f^{42}$. This binder, clutch and trip mechanism are so constructed and related, that the clutch will make two complete revolutions, and the wheel $f^{36}$ one complete revolution before the clutch is thrown out of gear with the constantly running sprocket $f^{42}$. The further actions of these parts, connected with the binder and shaft for operating the back-stop and discharge arms $f^9$, will appear in the statement of the operation, after describing the clutches, for operating the elevator.

The relation of the clutch devices comprised in the elevator drive, and the trips for the same, may be best traced on reference to Figs. 3, 4 and 5.

The sleeve $g$, hitherto noted, is provided with a clutch-disk $g'$, having on its forward face a pivoted pawl or clutch member $g^2$, which is under tension from a spring $g^3$, carried by the said disk, to assume its outermost position against a stop-pin $g^4$ on said disk. When in the outermost position of the said pivoted clutch member $g^2$, a forwardly projecting lug $g^5$ thereon will be in the path of either one of a pair of driving lugs $g^6$, shown as in the form of rollers on arms $g^7$, fixed to a driving sleeve $g^8$. The sleeve $g^8$ is loose on the constantly running shaft $b^{12}$; but is normally connected therewith through a clutch disk $g^9$, fixed to the forward end of the same, a pawl or clutch member $g^{10}$ pivoted thereto and under tension from a spring $g^{11}$ to assume its outermost position against a stop $g^{12}$ on said disk $g^9$, and provided with a lug $g^{13}$, which is normally engaged by one of the roller lugs $g^{14}$, on the two-arm driver $g^{15}$, carried by and rigid with the shaft $b^{12}$. This second clutch device, comprising the parts $g^9$ to $g^{15}$ inclusive, is in the nature of a safety appliance, to provide for the emergency possibility of a full gavel in the collector, before the elevated gavel could be bound. For present purposes, it will be most conducive to clearance, to regard the sleeve $g^8$ as if it was rigid with the shaft $b^{12}$, and confine attention to the first named clutch device comprising the parts $g'$ to $g^7$ inclusive. The pawl member $g^2$ of said clutch is normally held in its innermost position, out of gear with the driving member $g^6$ $g^7$, by a pin $g^{16}$ on a trip-lever $g^{17}$, pivoted to a bearing bracket $g^{18}$, and subject to the action of an adjustable spring $g^{19}$, connecting the same with a fixed part of the frame and tending to hold the same, as shown in Fig. 4, with the pin $g^{16}$ in engagement with the pivoted clutch member $g^2$. The upper arm of the trip-lever $g^{17}$ is connected by link $g^{20}$ with a curved tripping blade $g^{21}$, located in the gavel receiver $d^4$ and pivoted thereto at its lower end, as shown at $g^{22}$. The spring $g^{19}$ is of sufficient strength to hold the tripping blade $g^{21}$ inward to its limit against the accumulating gavel, until the grain is gathered into a gavel of the desired size, when the pressure thereon, from the packers $d^{17}$, will rock the blade $g^{21}$ outward, and the lower end of the tripping lever $g^{17}$ inward, thereby releasing the pivoted clutch member $g^2$, and permitting the same to be thrown by its spring $g^3$ into engagement with the driving member $g^6$ $g^7$. When the trip-lever $g^7$ is thus thrown into its releasing position, by the pressure of the accumulated gavel, it will be held by a pivoted bell-crank lock $g^{23}$, which is under tension from a spring $g^{24}$ to assume its lowermost position, and is provided with a notch $g^{25}$ on its under edge, which engages with the pin $g^{26}$ on the said lever and holds the same in its releasing position, until the bell-crank lever $g^{23}$ is again lifted by a pin $g^{27}$ on an idle gear $g^{28}$ journaled in the bearing bracket $g^{18}$, and engaged by a smaller gear $g^{29}$, fixed to the lower elevator shaft $f$. The said gears $g^{28}$ and $g^{29}$, are related as one to two, and the lower arm of the bell crank lock $g^{23}$ projects into the path of the stud $g^{27}$. Otherwise stated, the elevator shaft $f$ will be permitted to make two turns or nearly two turns before the bell-crank lock $g^{23}$ will be raised by the pin $g^{27}$, and the trip-lever $g^{17}$ be permitted to assume its normal position, for throwing the clutch device out of gear with the shaft $b^{12}$. These two turns of the elevator shafts $f$ $f'$ will move the elevator chains $f^3$ through one-half their entire course; and thereby, one set of the gavel hooks $f^7$ will have engaged the collected gavel in the receiver, raised the same to the binder table and delivered the same to the binding mechanism with a compressing action against the back-stop-arms $f^9$, and the other set of the gavel-hooks $f^7$ will have been brought down to their lowermost position below the receiver in position for engagement with the next gavel, when again tripped into action.

The elevator, through the gears $f^{56}$ $f^{57}$, the pin $f^{59}$ and the trip-lever $f^{58}$, trips the binding mechanism into action, at the proper time to do its work. On the initial movement of the gear $f^{36}$, after the binder clutch is closed, the lever $f^{31}$ and the sleeve $f^{29}$ will be rocked upward by the rod $f^{34}$, and thereby through the parts $f^{21}$ to $f^{28}$ inclusive, the needle-arm $f^{20}$ will be thrown upward into its binding position. On the return travel of the crank pin $f^{35}$ on the gear-wheel $f^{36}$, the said lever-arm $f^{31}$ and sleeve $f^{29}$ will be restored to their normal positions, carrying therewith the needle-arm $f^{20}$ into its lowermost or idle position; and the pawl $f^{32}$ carried by the lever $f^{31}$ and in engagement with the ratchet $f^{33}$ on the shaft $f^{30}$, will rotate the said shaft through one-half a revolution, and, through the parts $f^{37}$ $f^{38}$ and $f^{39}$ will impart to the shaft $f^8$ one-half of a complete turn, thereby shifting the position of the arms $f^9$ and discharging the bundle onto the face-plate $d^6$ of the binder table. The lock $f^{10}$ was raised, at the proper time, by the cam $f^{16}$ on the shaft $f^{17}$, operated by the gear $f^{36}$, as hitherto noted, to permit this movement of the shaft $f^8$ and the arms $f^9$. Near the return of the rod $f^{54}$ to its normal position, the cam-surface $f^{66}$ thereon, will come into play on the pin $f^{65}$ of the bell-crank lock $f^{60}$, to throw the same into its lowermost position and release the trip-lever $f^{53}$, thereby permitting the spring $f^{55}$ to become active, to throw the said trip-lever into its normal position, for engaging with the pivoted clutch member $f^{48}$ and throwing the same out of gear with the driving member on the constantly running sprocket wheel $f^{42}$.

Turning now to the safety clutch, comprising the parts $g^9$ to $g^{15}$ inclusive, hitherto noted, the other elements, for co-operation therewith, are a trip-lever $g^{30}$ pivoted to bracket $g^{31}$ and having, at its lower end a pin $g^{32}$ engageable with the lower arm of the pivoted clutch member $g^{10}$; a link $g^{33}$ connecting the upper end of the trip-lever $g^{30}$ with an arm $g^{34}$, fixed to the sleeve $f^{29}$, on the shaft $f^{30}$, and a spring $g^{35}$, tending to throw the trip-lever $g^{30}$ into its tripping position. The connection between the link $g^{33}$ and the arm $g^{34}$ is made by a slot $g^{36}$ in the link and a pin $g^{37}$ on the arm. Having regard to the action, when the sleeve $f^{29}$, under the motion from the rod $f^{34}$ moves upward, to throw the needle arm into binding position, the spring $g^{35}$ will become active, to throw the trip-lever $g^{30}$ into its tripping position, with respect to the clutch member $g^{10}$; where the said lever will remain until the return of the sleeve $f^{29}$ to its normal position, or until after the discharge of the bound bundle. At the very limit of the return motion of the sleeve $f^{29}$, the pin $g^{37}$ on the arm $g^{34}$, will become active on the link $g^{33}$ and the trip lever $g^{30}$, to throw the said trip-lever into its releasing position and hold the same thereagainst the tension of the spring $g^{35}$. The purpose of the slot $g^{36}$ is to provide for the excess of upward motion on the arm $g^{34}$, and permit a limited amount of idle motion of the said arm, in respect to the link $g^{33}$, on the return motion of the arm. The relative timing of the working clutch, comprising the parts $g'$ to $g^7$, to the safety clutch, comprising the parts $g^9$ to $g^{15}$, are such that the former will be tripped into its idle position, before the latter or safety clutch is rendered idle; but, the safety clutch will be tripped into its idle position, on the outward movement of the needle arm, and will be held idle, until after the bundle is bound and discharged. Hence, the elevator can never be tripped into action, until the binding mechanism is ready for co-operation therewith. There is, therefore, no possibility of any interference with the binding mechanism by the elevator, even if in extremely heavy grain, a gavel could be collected in the receiver, before the elevated gavel could be bound. It may be added, however, that this safety clutch and its trip device, is only a provision against emergency in extraordinary heavy grain. The binding mechanism is so speeded, that it could hardly fail to bind and discharge the elevated gavel before another could accumulate in the collector, under any ordinary conditions likely to occur.

A seat $h$ for the driver, is secured to the inner member of the frame-ties $a^4$, and provided with a foot-rest $h'$. The tongue for the attachment of the draft animals is applied, as shown at $k\ k'$ in Fig. 3. A cam $p$ and dog $p'$ lock chains $f^3$ from backward slippage. All the parts of the machine have now been specified, so far as herein shown, and it is thought that the operation of the same is clear from the detailed description. The general action may, however, be briefly summarized as follows:

The cut grain will be delivered from the platform carrier to the delivery roller and the feed-cylinder, which parts will in turn deliver the same into the gavel collector. When a gavel of the predetermined size has been collected, the clutch in the elevator drive will be tripped into gear with the constantly running shaft $b^{12}$, and the collected gavel will be carried up by the elevator and be delivered to the binder. The elevator co-operates with the back stop arms $f^9$, to compress the gavel and hold the same, until the binding is completed, thereby relieving the needle arm of any compressing strain. The elevator trips the clutch member of the binder-drive into action at the proper time. The binding mechanism completes its work and is automatically thrown out of gear. The clutch in the elevator drive is thrown out of gear, when the elevator traversed one-half its course; and the safety clutch is tripped during the binding motion of the needle-arm, and is released on the discharge of the bundle.

From the foregoing description, it is obvious that the gavel collector is independent of the binder and is always at work; and hence it follows that the binder might, if necessary, in heavy grain, be kept in almost continuous action. It is equally obvious, that, as the elevator is idle, during the greater part of the time, in normal condition of grain, that the power required for collecting the gavel, is comparatively light, as compared with the standard machines. Likewise, as all the mechanism for collecting the gavels and binding the same into bundles, is located inside the main driver or "bull-wheel," the transverse dimensions of the machine may be reduced to a minimum, the shortening or saving in this transverse dimension, as compared with the standard machine being about three feet. Otherwise stated, with my design, I can construct a machine for six feet cut, with a total transverse dimension of ten feet. The vertical dimension may also be greatly reduced, the saving in this respect being about twenty inches, as compared with the standard machines; or otherwise stated, the extreme height need not exceed forty inches. This fact, taken together with the location of the gavel collector at the platform level, brings most of the weight comparatively low or near the ground level. My design also permits the tongue to be arranged centrally, with respect to the load, as shown in Fig. 3, thereby preventing side draft. These several features taken together, greatly lessen the burden on the draft animals.

Of course it will be understood that, in the working machine, the binding mechanism would be shiftable from front to rear, for centering the same with respect to the bundle, in order to adapt the said mechanism to grains of different length. For the purpose of this case, it has not been deemed necessary to show either the reel or the knotter. These may be of any of the well known standard constructions.

What I claim, and desire to secure by Letters Patent of the United States, is as follows:

1. In a harvester, the combination with an elevated binder, of a low down gavel collector, and an elevator having sets of gavel hooks or arms, spaced apart lengthwise of the elevator, which become operative, in succession, to engage the collected gavels to deliver the same to the binder, and to hold the said gavel under the binding action, substantially as described.

2. In a harvester, the combination with an elevated binder, of a low down gavel collector, and an endless elevator having sets of gavel hooks or arms, spaced apart lengthwise of the elevator, which become operative in succession to engage the collected gavels deliver the same to the binder, to compress and to hold the said gavel under the binding action substantially as described.

3. In a harvester, the combination with an elevated binder, of a low down gavel collector, an elevator, for conducting the gavel from the collector to the binder, a drive for the elevator having a clutch controlled, for starting, by the gavel and for stopping, by the elevator, and a drive for the binder, having a clutch, controlled, for starting, by said elevator and, for stopping, by the binder shaft, substantially as described.

4. In a harvester, the combination with a binder having back stops, for resisting the compressing and binding action, of a conveyer having gavel hooks which compress the gavel against said back stops and, in cooperation, therewith, hold the gavel until bound, whereby the needle arm is relieved from compressing strain, substantially as described.

5. In a harvester, the combination with the elevated binder, comprising as an element thereof, the rotary shaft having back stop and discharge arms, of the low down gavel collector, and the elevator chains having gavel hooks which operate to conduct the gavel from the collector to the binder and to compress and hold the same against said back stop arms, until bound, substantially as described.

6. In a harvester, the combination with the elevated binder including as an element thereof the shaft having the back stop and discharge arms, of the low down gavel collector, the elevator with gavel hooks, operating as described, the yieldingly held lock for said back stop arms independent of the gavel operated binder trip and the trip for said lock, all arranged and operating, substantially as and for the purposes set forth.

7. In a binder, the combination with the knotter shaft proper, for operating the knotter of the independent back stop and discharge shaft, the shaft $f^{30}$ with connections for rotating said back stop and discharge shaft, the pivoted needle, the needle operating rocker $f^{29}$ sleeved on said shaft $f^{30}$ and receiving a rocking motion from said knotter shaft, and a pawl and ratchet device connecting said sleeve $f^{29}$ and said shaft $f^{30}$, for moving said shaft $f^{30}$ in a constant direction, substantially as described.

8. In a harvester, the combination with an elevated binder, of a low down gavel collector, an elevator for conducting the gavel from the collector to the binder, and a drive for said elevator, comprising as elements thereof a working and a safety clutch, with trips for the same, the former of which is normally open and is controlled by the gavel, for starting, and, by the elevator, for stopping, and the latter of which is normally closed and is opened on an initial motion of the binder and held open until the bundle is discharged, substantially as described.

9. In a harvester, the combination with the elevated binder, the low down gavel collector and the elevator, of an elevator drive including clutch mechanism having two independent sets of tripping devices, one of which trips is controlled from the gavel and elevator and the other from the binder, to keep the drive idle until the binding has been completed, substantially as described.

10. In a harvester, the low down gavel collector, comprising the combination with the receiver and the feed cylinder, of the packer arms working in said receiver and receiving motion from said cylinder, substantially as described.

11. In a harvester, the combination with the gavel receiver $d^4$ and the feed cylinder $d^7$ $d^8$ having cam lugs $d^{13}$ on one of its disks, of the packer shaft $d^{16}$ having the packer arms $d^{17}$ and the lever arms $d^{14}$ fixed to said shaft and subject to the action of said cam lugs, for operating the packers, substantially as described.

In testimony whereof I affix my signature in presence of two witnesses.

ALBERT W. STERNKE.

Witnesses:
J. E. DAYTON,
F. M. NORTON.